United States Patent
Vorobieva et al.

(10) Patent No.: US 11,906,444 B2
(45) Date of Patent: Feb. 20, 2024

(54) METHOD FOR TRAINING A SYSTEM FOR AUTOMATICALLY DETECTING A DEFECT IN A TURBOMACHINE BLADE

(71) Applicant: SAFRAN, Paris (FR)

(72) Inventors: Héléna Vorobieva, Moissy-Cramayel (FR); Sylvaine Picard, Moissy-Cramayel (FR)

(73) Assignee: SAFRAN, Paris (FR)

( * ) Notice: Subject to any disclaimer, the term of this patent is extended or adjusted under 35 U.S.C. 154(b) by 360 days.

(21) Appl. No.: 17/606,955

(22) PCT Filed: Apr. 3, 2020

(86) PCT No.: PCT/EP2020/059551
§ 371 (c)(1),
(2) Date: Oct. 27, 2021

(87) PCT Pub. No.: WO2020/221550
PCT Pub. Date: Nov. 5, 2020

(65) Prior Publication Data
US 2022/0215522 A1 Jul. 7, 2022

(30) Foreign Application Priority Data
Apr. 30, 2019 (FR) ..................... 1904579

(51) Int. Cl.
| G06V 10/00 | (2022.01) |
| G01N 21/95 | (2006.01) |
| G06T 7/90 | (2017.01) |
| G06T 7/00 | (2017.01) |
| G06V 10/28 | (2022.01) |
| G06V 10/98 | (2022.01) |

(52) U.S. Cl.
CPC ....... *G01N 21/9515* (2013.01); *G06T 3/4046* (2013.01); *G06T 7/001* (2013.01);
(Continued)

(58) Field of Classification Search
CPC ............. G01N 21/9515; G01N 21/88; G01N 21/9501; G01N 21/8887; G01N 21/8851;
(Continued)

(56) References Cited

U.S. PATENT DOCUMENTS

| 5,102,221 A | * | 4/1992 | Desgranges | .......... F01D 21/003 356/241.1 |
| 5,686,669 A | * | 11/1997 | Hernandez | ............. G01H 1/003 73/659 |

(Continued)

FOREIGN PATENT DOCUMENTS

CN  109030498 A  12/2018

OTHER PUBLICATIONS

International Search Report in International Application No. PCT/EP2020/059551, dated Aug. 10, 2020 (4 pages).
(Continued)

*Primary Examiner* — Amir Alavi
(74) *Attorney, Agent, or Firm* — Bookoff McAndrews, PLLC

(57) ABSTRACT

A method for training a system for automatically detecting a defect of a blade of a turbomachine including a platform intended to receive a blade, at least one image-acquiring device, at least one light source the luminous intensity of which may vary, at least one moving device configured to move the platform with respect to the at least one image-acquiring device or to move the at least one image-acquiring device with respect to the platform, and a processing unit configured to receive acquired images and associate them with the items of information relating to the luminous intensity of the at least one light source and to the relative position of the platform with respect to the at least one image-acquiring device during the image acquisition.

5 Claims, 1 Drawing Sheet

(52) U.S. Cl.
CPC .............. *G06T 7/90* (2017.01); *G06V 10/28* (2022.01); *G06V 10/993* (2022.01)

(58) Field of Classification Search
CPC ........ G06N 20/00; G06N 3/045; G01B 11/00; G06K 9/03; G06K 9/38; G06K 9/62; G06T 7/00; G06T 7/0004; G06T 7/001; G06T 7/90; G06T 2207/20081; G06T 2207/20084; G06T 2207/30164; G06T 3/4043; G06V 10/28; G06V 10/993
See application file for complete search history.

(56) References Cited

U.S. PATENT DOCUMENTS

| | | | | |
|---|---|---|---|---|
| 7,850,892 | B2* | 12/2010 | Romero | B29C 70/48 |
| | | | | 264/257 |
| 8,042,412 | B2* | 10/2011 | Xia | G01L 3/12 |
| | | | | 73/800 |
| 8,569,928 | B2* | 10/2013 | Szwedowicz | F01D 5/16 |
| | | | | 310/326 |
| 8,862,433 | B2* | 10/2014 | Yerramalla | G05B 9/02 |
| | | | | 702/183 |
| 9,194,250 | B1* | 11/2015 | Tralshawala | F01D 11/20 |
| 9,569,397 | B2* | 2/2017 | Higgins | G06Q 10/20 |
| 10,927,675 | B2* | 2/2021 | Ahmad | B23P 6/007 |
| 11,542,820 | B2* | 1/2023 | Tiemon | B23P 15/04 |
| 2009/0320609 | A1* | 12/2009 | Xia | G01L 3/12 |
| | | | | 73/862.08 |
| 2018/0270465 | A1 | 9/2018 | Bendall | |
| 2019/0005634 | A1 | 1/2019 | Kung et al. | |
| 2022/0215522 | A1* | 7/2022 | Vorobieva | G06F 18/217 |

OTHER PUBLICATIONS

Written Opinion of the International Searching Authority in International Application No. PCT/EP2020/059551, dated Aug. 10, 2020 (6 pages).

* cited by examiner

[Fig. 1]
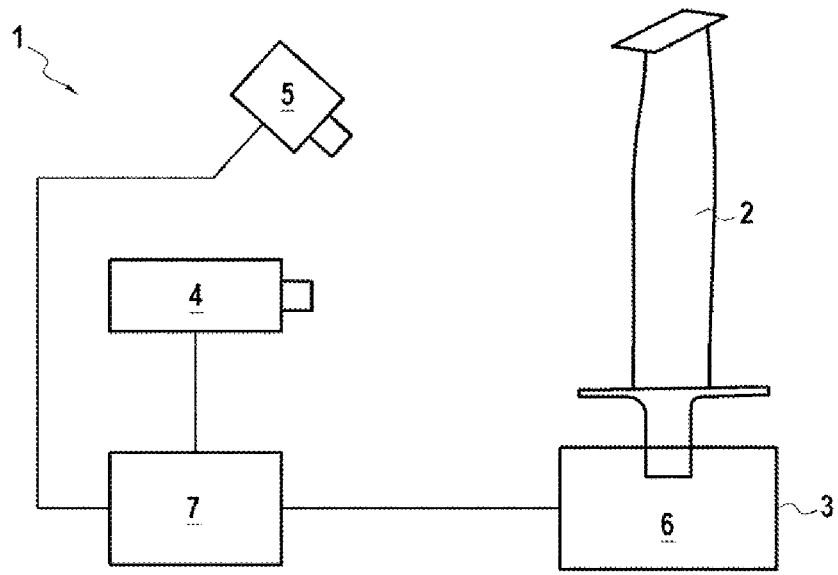
[Fig. 2]
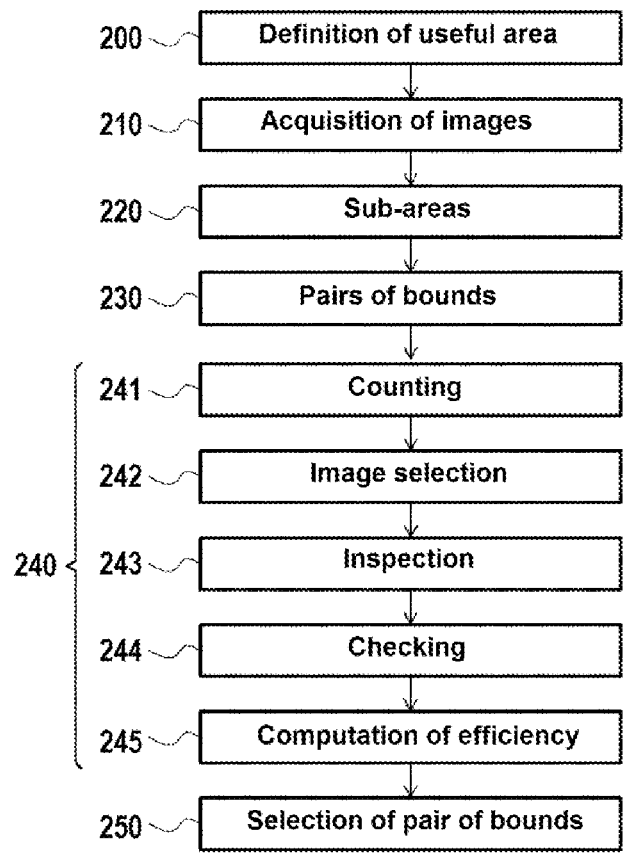

METHOD FOR TRAINING A SYSTEM FOR AUTOMATICALLY DETECTING A DEFECT IN A TURBOMACHINE BLADE

CROSS-REFERENCE TO RELATED APPLICATION(S)

This application is the U.S. national phase entry under 35 U.S.C. § 371 of International Application No. PCT/EP2020/059551, filed on Apr. 3, 2020, which claims priority to French Patent Application No. 1904579, filed on Apr. 30, 2019.

TECHNICAL FIELD

The invention relates to the non-destructive checking of an aerospace part such as a turbine blade.

PRIOR ART

The checking of the blades of a turbomachine for the detection of surface defects such as small dents, roughness, excess material or material lacks in certain places, is generally done by operating customers.

One possible way of performing this inspection is to place the blade to be inspected on a mount, illuminate it and take photographs at good resolution. Based on these photographs, it is then necessary to determine whether a defect is present on the blade surface. Grayscale photographs are enough to detect the types of defect mentioned previously.

However, several problems arise regarding the taking of photographs that can be used to obtain grayscale photographs allowing the comparison and detection of any defects on the blade surface.

Firstly, the inspected blades generally have a specular and textured coating. Consequently, if the blade is illuminated with sufficient intensity for certain coating details to be visible on a part of the blade, other parts of the blade risk being overexposed and the corresponding parts on the obtained image will then be unusable. Furthermore, the relief formed by the texture of the coating makes it difficult or even impossible to determine an optimal illumination (nearby pixels in the image will have different behaviors).

Secondly, certain blades such as turbine blades have a non-trivial curvature. Thus, if the turbine blade is illuminated, certain parts of the blade will be in shadow which will have the consequence of rendering unusable the corresponding parts on the image obtained. In addition, given that the curvature of the blade is present on all the parts of the blade, it is not possible to use raking light techniques.

Thirdly, the coating of the blades can vary slightly. This implies that with identical lighting and an identical position facing the image-acquiring device, the blades will appear on the images in a different way, which may be too illuminated and not illuminated enough in one and the same place on the image.

Fourth, even with a precise positioning system, precision can never be total. This has the consequence that images of different blades acquired at theoretically identical positions facing the image-acquiring device will not be strictly identical, leading to noise in the positioning. This offset amplifies the problems mentioned previously.

Moreover, blade images taken at sufficient resolution to see defects are generally images in grayscale, i.e. with pixels taking integer values between 0 and 255, and having a fairly chaotic blade texture of non-uniform surface appearance, which means that a usable area contains many different pixel values, which can range from 0 to 255. The term "usable area" means an unblurred area that is lit in such a way that a defect is visible.

It is quite easy to delimit useful areas on each acquired image, each acquired image corresponding to a given pose of the blade facing the image-acquiring device, and a useful area being an area that is unblurred and for which it is possible to adjust the lighting in such a way that it is correct, i.e. not overexposed and not too dark. However, for a given photo, the best lighting will not be the same for all the useful areas due to the geometry and specularity of the blade. Moreover, as explained above, the best lighting over a given area and for a given pose is not necessarily the same from one blade to another. Consequently, the lighting of the useful areas is not a parameter that could be set by hand.

A method is known for inspecting surface defects on objects in which photographs of the object are taken under one or different illuminations, then one or more images that might have a defect are chosen. The images are inspected in their entirety in such a way as to determine whether they have very well-lit regions or in the shade (these regions are then characteristic of a defect) and in such a way as to see predefined defect characteristics. The images may be compared to reference images. In this method, whatever their illumination conditions, all the images undergo a first processing step with a first filter to eliminate the images not containing any defect. Other steps follow to iteratively eliminate more and more images.

However, the successive processing of the images to keep only the images having the best illumination for the task of defect detection before proceeding to any filtering with respect to defects, represents a considerable time cost in the total processing for defect detection. Specifically, the computing time for the defect detection task is longer as a result.

In addition, each time the known method processes the image in its entirety.

It is also known to use a method for inspecting objects with a curvature. In this method, two light sources are used in such a way as to create a light facing the object, known as "bright field illumination", and a light raking the object, known as "dark field illumination". These light sources may move with respect to the object. The inspection to find defects is then carried out based on the images acquired from these two viewpoints.

However, with objects having a non-trivial curvature, varying continuously as much along the horizontal direction as the vertical, it would be necessary to increase the different positions of the light sources to be at the right angle with respect to each small area.

In a fairly similar way to the previous method, there is known a method in which two light sources, located with respect to a precise angle in relation to the surface to be inspected, move along a scan line to capture sub-images and reconstitute a final image to be inspected. In this method, there is thus no need to use different light intensities. The luminous intensity used is already optimal since the angle of incidence is optimal.

However, such a method would be ineffective with non-trivial object curvatures since it would be necessary to use an excessively large number of different scan lines.

SUMMARY OF THE INVENTION

The invention aims to provide an automatic method for choosing the best lighting over a given area in order to automate the control of the surface of a turbomachine blade by learning method, and more specifically to provide a method for training a system for automatically detecting defects of a blade of a turbomachine comprising a platform intended to receive a blade.

According to a subject of the invention, provision is made for a method for training a system for automatically detecting a defect of a blade of a turbomachine comprising a platform intended to receive a blade, at least one image-acquiring means, at least one light source, the luminous intensity of which may vary, at least one moving means configured to move the platform with respect to said at least one image-acquiring means or to move said at least one image-acquiring means with respect to the platform, and a processing unit configured to receive acquired images and associate them with the items of information relating to the luminous intensity of said at least one light source and to the relative position of the platform with respect to said at least one image-acquiring device during the image acquisition.

According to a general feature, the training method comprises, for each of the blades to be studied of a set of blades with surface defects that have already been identified, the following steps:

defining a useful area on the blade to be studied,
producing, for each separate relative position of the platform with respect to said at least one image-acquiring device, a plurality of acquired images of the useful area of the blade, each of the acquired images for one and the same relative position being produced with a different luminous intensity,
dividing each image of the useful area from one acquired image into a plurality of images of sub-areas,
determining a plurality of pairs of pixel intensity bounds, each pair comprising a minimum intensity and a maximum intensity,
for each pair of bounds:
  a. determining the number of pixels contained in each of the images of the sub-area having an intensity between the minimum intensity and the maximum intensity of the pair of bounds, then
  b. selecting a single image for each sub-area at a given relative position, the selected image corresponding to the image comprising the most pixels, the intensity of which is between said minimum and maximum intensities of the pair of bounds, then
  c. inspecting each sub-area at a given relative position by a classifying convolutional neural network to detect the presence of any defects, then
  d. checking the detections made by the classifying convolutional neural network to determine whether the detected defects are real or false, and
  e. computing the detection efficiency for the given pair of bounds over the useful area on the basis of all the given relative positions, the detection efficiency depending on the ratio of the number of proven detections to the number of false detections,
selecting the pair of bounds having the best detection efficiency.

The method according to the invention comprises an efficient pre-processing making it possible to select the sub-areas from images acquired at the same place under different luminous intensities that will later be used to detect anomalies. This preprocessing first consists in configuring the sub-areas according to the number of pixels contained in different pairs of minimum and maximum bounds. During the adjustment phase, which is only to be done once, the best pair of bounds is chosen in such a way as to supply the best possible performance with respect to the detection algorithm that will be used later in the processing line. During the production line phase, the best sub-area is chosen directly with respect to the terminal set at the time of adjustment, which is fast and makes it possible not to increase the number of sub-areas to be tested in detection.

The invention thus makes provision for a method for training an automatic detection system so that the detecting method implemented by said system keeps only the images having the best illumination for the defect detection task before proceeding to any filtering with respect to the defects, which thus makes it possible to save computing time for the defect detection task.

In addition, the invention makes provision for independently processing areas of the images and not necessarily the entire image.

In addition, the method makes it possible to avoid the repositioning of the light sources at a particular angle with respect to the object. The images are usable as long as the luminosity of an area is sufficient with one of the intensities used.

With the invention, large areas may be illuminated at a single position of the light source which makes it possible to process blades with a non-trivial curvature without having to increase the number of different positions of the light sources to find the right angle with respect to each small area.

The pair of bounds selected may thus be chosen to then make it possible to choose, for each sub-area, a single image from among the different available images acquired with different intensities, with a view to future training steps or the use of a system for automatically detecting defects of a blade.

According to a first aspect of the training method, if, in step b, at least two images comprise the same number of pixels, the image of the sub-area selected is that for which the average of the pixel intensities is the nearest to an intensity of 127.5.

According to a second aspect of the training method, the method can further comprise the generation of additional images on the basis of images from these acquisitions that can be used in addition to the intensity images.

According to a third aspect of the training method, the different intensities used are the same for each separate relative position of the platform with respect to said at least one image-acquiring device.

According to a fourth aspect of the training method, from among all the sub-areas of the useful areas of the studied blades, it is possible to use as many sub-areas without defects as there are sub-areas having a defect.

It is thus possible not to use certain sub-areas, so that the number of sub-areas with and without defects are the same. If there are fewer sub-areas with defects, it is possible to choose at random as many sub-areas without defects from among all the available sub-areas without defects as there are sub-areas with defects. If there are fewer sub-areas without defects, it is possible to choose at random as many sub-areas with defects from among all the available sub-areas with defects as there are sub-areas without defects. Another number of sub-areas can also be chosen. For this aspect of the training method, it is possible to proceed blade by blade or all blades together.

In another subject of the invention, provision is made for a system for automatically detecting a defect of a blade of a turbomachine comprising a platform intended to receive a blade, at least one image-acquiring means, at least one light source, the luminous intensity of which can vary, at least one moving means configured to move the platform with respect to said at least one image-acquiring means or to move said at least one image-acquiring means with respect to the platform, and a processing unit configured to receive acquired images and associated them with items of information relating to the luminous intensity of said at least one light source and to the relative position of the platform with respect to said at least one image-acquiring device during the image acquisition, a plurality of acquired images being taken for each of said relative positions with, for each acquired image, a luminous intensity of said at least one light source.

According to a general feature of the invention, the processing unit is configured to define a useful area on the blade, divide the image coming from the acquisition of a useful area into a plurality of sub-areas, and process each sub-area.

According to an aspect of the automatic detection system, to process each sub-area, the processing unit can be configured so that only a single sub-area image is chosen from among the plurality of additional images generated on the basis of the images coming from the acquisitions, this choice being made using a predefined pair of bounds, according to the following steps:
  a. determining the number of pixels contained in each of the images of the sub-area having an intensity between the minimum intensity and the maximum intensity of the pair of bounds, then
  b. selecting a single image for each sub-area at a given relative position, the selected image corresponding to the image comprising the most pixels, the intensity of which is between said minimum and maximum intensities of the pair of bounds.

BRIEF DESCRIPTION OF THE DRAWINGS

FIG. 1 is a schematic representation of a system for automatically detecting a defect of a blade of a turbomachine according to an embodiment of the invention.

FIG. 2 shows a flow chart of a method for training the system for automatically detecting a defect of a blade of a turbomachine of FIG. 1 according to a mode of implementation of the invention.

DESCRIPTION OF THE EMBODIMENTS

FIG. 1 schematically represents a system for automatically detecting a defect of a blade of a turbomachine.

The system 1 for automatically detecting a defect of a blade 2 of a turbomachine comprises a movable platform 3 on which is placed the blade 2 to be studied, a fixed camera 4 and a fixed light source 5 of which the luminous intensity can vary. The blade 2 is sat on the platform 3 vertically. In other words, the blade 2 comprises a blade root 22, a blade 24 and a blade tip 26, the blade 24 extending between the root 22 and the tip 26, and the root 22 resting on the platform 3 in such a way that the blade 24 extends in a direction orthogonal to the surface of the platform 3 on which the blade root 22 rests, said orthogonal direction corresponding to the vertical direction.

In the embodiment illustrated in FIG. 1, the platform 3 is movable and can move with respect to the camera 4 and to the light source 5 which both remain in fixed positions owing to moving means 6 included in the platform 3. In order to capture images around the blade 2, the platform 3 can pivot on itself about an axis of rotation and move vertically and horizontally.

The detecting system 1 further comprises a processing unit 7 coupled to the platform 3, to the camera 4 and to the light source 5. The processing unit 7 is configured to receive acquired images transmitted by the camera 4 and associate them with the information relating to the luminous intensity of the light source 5 and to the position of the platform during the image acquisition.

FIG. 2 schematically represents a flow chart of a training method implemented by the system for automatically detecting a defect of a blade of a turbomachine of FIG. 1 to optimize its operation during a defect search effected on an unknown blade.

To train the detection system 1, a set of known blades is used, the defects of which are known and have already been recorded in the processing unit 7.

For each of the blades to be studied of the set of blades, the training method performs the following steps.

In a first step 200, the camera 4, the light source 5 and the platform 3 are adjusted to acquire images making it possible to cover the entire blade 2 by useful areas. On each image thus acquired, the useful areas are delimited.

In a following step 210, for each position of the platform 3, a plurality of images of each useful area of the blade 2 are acquired using the camera 4, each image for one and the same position of the platform 3 being acquired with a different luminous intensity of the light source 5. The detecting system 1 may be configured to acquire the same number of images for each position, for example twenty acquired images for one and the same position of the platform 3, with a different intensity for each acquired image. One therefore has, for each position of the platform 3, twenty or so acquired images of the useful area of the blade 2 to be studied, each with a different intensity, i.e. twenty different luminous intensities.

In a following step 220, each image acquired by the camera 4 is transmitted to the processing unit which divides the acquired image into a plurality of images of sub-areas.

In a following step 230, a plurality of pairs of bounds of pixel intensity are inputted, each couple comprising a minimum intensity and a maximum intensity.

Then, in a step 240, the most efficient pair of bounds is determined by performing the following steps for each pair of bounds.

In a first sub-step 241, for each of the images of a sub-area, one determines the number of pixels contained in the image and having an intensity between the minimum intensity and the maximum intensity of the pair of bounds.

Then, in a second sub-step 242, a single image is selected from among the different images, taken with different luminous intensities, of one and the same sub-area at a given position of the platform 3. The selected image corresponds to the image comprising the most pixels, the intensity of which is between said minimum and maximum intensities of the pair of bounds. If at least two images comprise the same number of pixels, the image of the sub-area selected is that for which the average of the intensities of the pixels is the nearest to an intensity of 127.5.

Then, in a third sub-step 243, for each position of the platform 3, each sub-area is inspected using a classifying convolutional neural network to detect the presence any defects.

The, in a fourth sub-step 244, the detections made by the classifying convolutional neural network are compared with a recorded table locating the known defects of the blade to determine whether the detected defects are real or false.

Then, in a fifth sub-step 245, a detection efficiency is then computed for the given pair of bounds over the useful area, taking all the positions of the platform 3. The detection efficiency depends on the ratio of the number of proven detections to the number of false detections.

Finally, in a step 250, the pair of bounds having the best detection efficiency is selected.

The invention thus provides a method for training a system for automatically detecting a defect of a blade of a turbomachine comprising a platform intended to receive a blade, to automate the control of the surface of a blade of a turbomachine by learning method.

The invention claimed is:

1. A method for training a system for automatically detecting a defect of a blade of a turbomachine comprising a platform intended to receive a blade, at least one image-acquiring means, at least one light source the luminous intensity of which may vary, at least one moving means configured to move the platform with respect to said at least one image-acquiring means or to move said at least one image-acquiring means with respect to the platform, and a processing unit configured to receive acquired images and associate them with the items of information relating to the luminous intensity of said at least one light source and to the relative position of the platform with respect to said at least one image-acquiring device during the image acquisition, the training method comprising, for each of the blades to be studied a set of blades with surface defects that have already been identified, the following steps:

defining useful areas on the blade, producing, for each separate relative position of the platform with respect to said at least one image-acquiring device, a plurality of acquired images of the useful area of the blade, each of the acquired images for one and the same relative position being produced with a different luminous intensity, dividing each image of the useful area from one acquired image into a plurality of images of sub-areas, determining a plurality of pairs of pixel intensity bounds, each pair comprising a minimum intensity and a maximum intensity, for each pair of bounds:

a. for each sub-area of a useful area, determining the number of pixels contained in each of the images of the sub-area having an intensity between the minimum intensity and the maximum intensity of the pair of bounds, then b. for each given relative position, for each sub-area of said relative position, selecting a single image, the selected image corresponding to the image comprising the most pixels, the intensity of which is between said minimum and maximum intensities of the pair of bounds, then c. for each given relative position, for each sub-area, inspecting each corresponding selected image for this sub-area by a classifying convolutional neural network to detect the presence of any defects, then d. checking the detections made by the classifying convolutional neural network to determine whether the detected defects are real or false, and e. computing the detection efficiency for the given pair of bounds over the useful area on the basis of all the given relative positions, the detection efficiency depending on the ratio of the number of proven detections to the number of false detections, selecting the pair of bounds having the best detection efficiency.

2. The method as claimed in claim 1, wherein if, in step b, at least two images comprise the same number of pixels, the image of the sub-area selected is that for which the average of the pixel intensities is the nearest to an intensity of 127.5.

3. The method as claimed in claim 1, further comprising the generation of additional images on the basis of images from these acquisitions that can be used in addition to the intensity images.

4. The method as claimed in claim 1, wherein the different intensities used are the same for each separate relative position of the platform with respect to said at least one image-acquiring device.

5. The method as claimed in claim 1, wherein are chosen, from among all the sub-areas of the useful areas of the studied blades, as many sub-areas without defects as there are sub-areas having a defect.

* * * * *